(12) United States Patent
Yang et al.

(10) Patent No.: US 9,964,277 B2
(45) Date of Patent: May 8, 2018

(54) LAMP APPARATUS FOR VEHICLE

(71) Applicant: Hyundai Motor Company, Seoul (KR)

(72) Inventors: Jeong Gyu Yang, Yongin-si (KR); Byoung Suk Ahn, Suwon-si (KR); Jin Ho Na, Suwon-si (KR); Jik Soo Shin, Incheon (KR)

(73) Assignee: Hyundai Motor Company, Seoul (KR)

( * ) Notice: Subject to any disclaimer, the term of this patent is extended or adjusted under 35 U.S.C. 154(b) by 212 days.

(21) Appl. No.: 14/941,566

(22) Filed: Nov. 14, 2015

(65) Prior Publication Data

US 2017/0059112 A1 Mar. 2, 2017

(30) Foreign Application Priority Data

Aug. 28, 2015 (KR) ........................ 10-2015-0121650

(51) Int. Cl.
*F21V 5/00* (2018.01)
*F21S 8/10* (2006.01)

(52) U.S. Cl.
CPC ......... *F21S 48/2212* (2013.01); *F21S 48/215* (2013.01); *F21S 48/234* (2013.01); *F21S 48/24* (2013.01)

(58) Field of Classification Search
CPC .... F21S 48/215; F21S 48/214; F21S 48/2212; F21S 48/24; F21S 48/30
See application file for complete search history.

(56) References Cited

U.S. PATENT DOCUMENTS

| | | | | |
|---|---|---|---|---|
| 2,026,478 A | * | 12/1935 | Lisintzki | G03B 21/208 362/268 |
| 2,525,598 A | * | 10/1950 | Gruber | G03B 35/20 352/198 |
| 3,431,423 A | * | 3/1969 | Keller | G01N 15/1429 250/574 |
| 3,501,626 A | * | 3/1970 | Benard | G02B 19/0028 362/1 |
| 3,944,351 A | * | 3/1976 | Ito | G03B 21/10 353/31 |
| 4,814,950 A | * | 3/1989 | Nakata | F21S 48/1233 362/331 |
| 5,897,192 A | * | 4/1999 | Seufert | G03B 21/10 353/119 |
| 6,161,952 A | | 12/2000 | Schuster et al. | |
| 6,305,830 B1 | * | 10/2001 | Zwick | F21S 48/215 362/308 |

(Continued)

FOREIGN PATENT DOCUMENTS

| | | |
|---|---|---|
| JP | 3632809 B2 | 3/2005 |
| JP | 2007-287521 A | 11/2007 |

(Continued)

*Primary Examiner* — Ali Alavi
(74) *Attorney, Agent, or Firm* — Morgan, Lewis & Bockius LLP

(57) ABSTRACT

A lamp apparatus for a vehicle may include a light source radiating light for specific images; reflectors symmetrically disposed at both sides of the light source and reflecting light from the light source, and a condensing lens disposed ahead of the light source, receiving light from the light source and light from the reflectors, having two or more lenses to concentrate light, and having a curved shape with respect to the light source so that a plurality of images is formed by the light from the light source.

6 Claims, 2 Drawing Sheets

(56) References Cited

U.S. PATENT DOCUMENTS

| | | | | |
|---|---|---|---|---|
| 6,373,629 | B1* | 4/2002 | Yamagishi | G02B 27/283 348/E5.141 |
| 6,382,822 | B1* | 5/2002 | Maekawa | F21S 48/1233 362/309 |
| 6,634,759 | B1* | 10/2003 | Li | G02B 6/0006 359/853 |
| 6,976,772 | B2* | 12/2005 | Albou | B60Q 1/14 362/293 |
| 2004/0208019 | A1* | 10/2004 | Koizumi | F21S 48/2237 362/545 |

FOREIGN PATENT DOCUMENTS

| | | |
|---|---|---|
| JP | 2009-523308 A | 6/2009 |
| KR | 10-0803310 B1 | 2/2008 |
| KR | 10-2013-0063200 A | 6/2013 |
| KR | 10-1470194 B1 | 12/2014 |
| WO | WO 2007/082021 A2 | 7/2007 |

\* cited by examiner

LAMP APPARATUS FOR VEHICLE

CROSS REFERENCE TO RELATED APPLICATION

The present application claims priority to Korean Patent Application No. 10-2015-0121650, filed Aug. 28, 2015, the entire contents of which is incorporated herein for all purposes by this reference.

BACKGROUND OF THE INVENTION

Field of the Invention

The present invention relates to a lamp apparatus for a vehicle that can achieve a plurality of 3D images from one light source.

Description of Related Art

In general, automotive lamps are classified into a tail lamp, a brake lamp that is turned on when the brake pedal is pressed down, and a turn signal lamp.

Recently, lamps using light emitting diode (LED) having a long lifespan and high optical efficiency as light sources are increasingly used. A light source module 10 of a lamp of the related art, as shown in FIG. 1, includes an LED light source 11, a printed circuit board (PCB) 12 controlling power supplied to the LED light source 11, a reflecting plate 13 for reflecting light from the LED light source 11 to an outer lens 21, and a diffusion lens 14 disposed ahead of the reflecting plate 13 and diffusing light from the LED light source 11.

The lamp of the related art radiates light from the LED light source 11 through the outer lens 21 and the diffusion lens 14, in which the image of light is radiated as simple light. However, recently a technology of giving a 3D image to light from a lamp has been developed to improve the quality of vehicles. However, when a 3D image for light radiated from a lamp is formed, the 3D image can only be shown within a predetermined range of angle, so when a 3D image comes out of the observation angle, it is distorted or cut.

As described above, lamps are recently designed not only to improve visibility of light, but to improve design, but the design of light from the light source module of the related art described above is monotonous, and even if a 3D image is implemented, the 3D image can only be shown within a predetermined range of observation angle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lamp apparatus for a vehicle that implements a plurality of 3D images from one light source and is configured in a small package by simplifying the structure for implementing the 3D images.

In an aspect of the present invention, there is provided a lamp apparatus for a vehicle that includes: a light source radiating light for specific images; reflectors symmetrically disposed at both sides of the light source and reflecting light from the light source; and a condensing lens disposed ahead of the light source, receiving light from the light source and light from the reflectors, composed of two or more lenses to concentrate light, and having a curved shape with respect to the light source so that a plurality of images is formed by the light from the light source.

The reflectors may include a left reflecting plate and a right reflecting plate symmetrically disposed at both sides of the light source and a condensing lens may be fixed between the left reflecting plate and the right reflecting plate.

The condensing lens may include two Fresnel lenses symmetrically arranged in a front-rear direction.

The condensing lens may include a center lens and a left lens and a right lens curved at a predetermined angle and extending from both ends of the center lens, and the left lens and the right lens may be curved at the same angle as an observable angle of an image formed through the center lens.

The light source may be an actual light source and positioned in a central normal line of the center lens, and a left virtual image light source and a right virtual image light source may be positioned in a central normal line of the left lens and a central normal line of the right lens, respectively.

The reflectors may include a left reflecting plate and a right reflecting plate, and the left reflecting plate and the right reflecting plate may be tilted at predetermined angles so that the left virtual image light source and the right virtual image light source are positioned on the central normal lines of the left lens and the right lens, respectively.

When observable angles of images formed through the left lens and the right lens are different from an observable angle of the center lens, curved angles of the left lens and the right lens may be set smaller than the observable angle of the center lens.

According to a lamp apparatus for a vehicle that has the structure described above, a plurality of 3D images can be implemented from one light source, a package is reduced by simplifying the structure for implementing the 3D images, and the apparatus can be more freely designed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
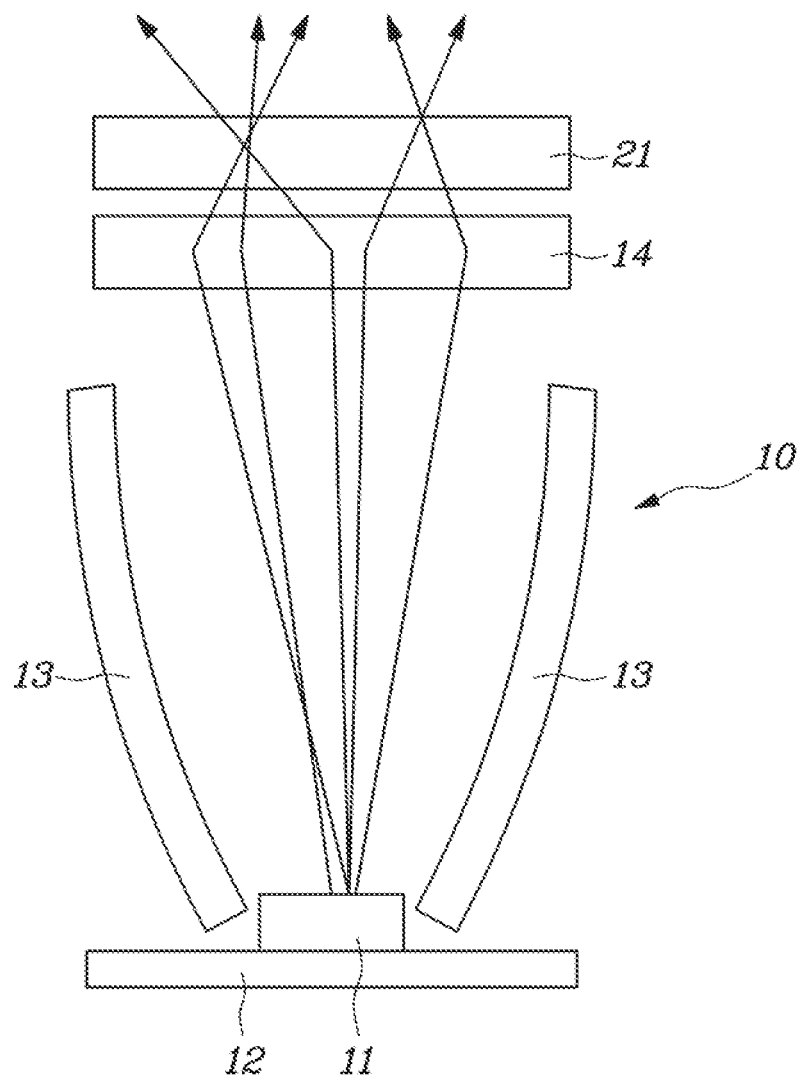
FIG. 1 is a view showing a lamp apparatus for a vehicle of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGS. of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A lamp apparatus for a vehicle according to embodiments of the present invention is described hereafter with reference to the accompanying drawings.

Figure 2:
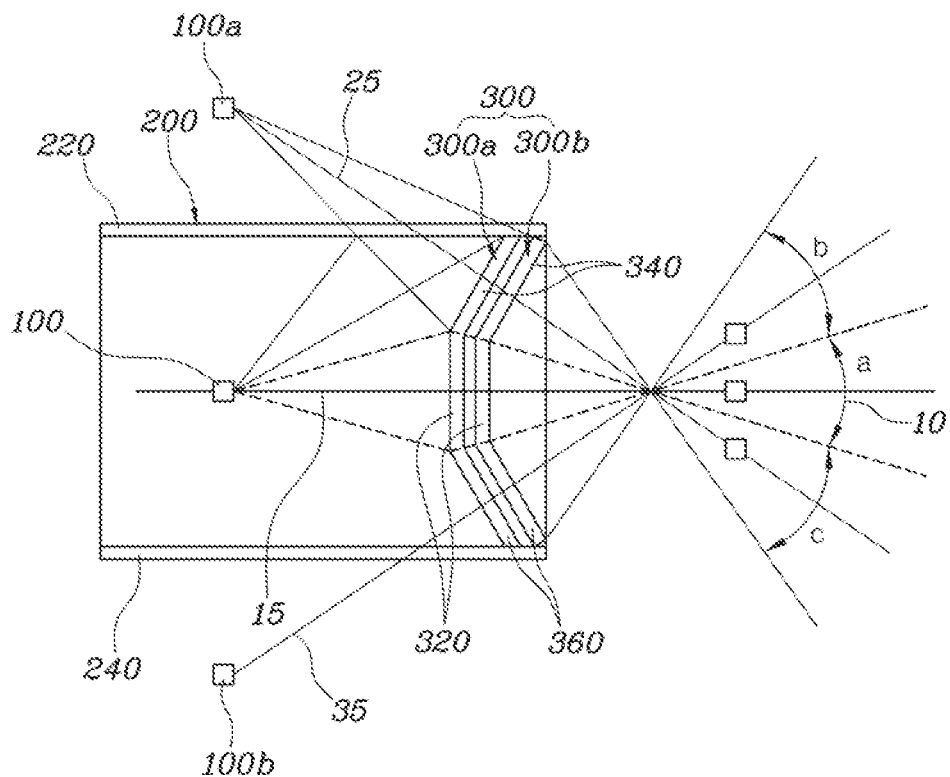
FIG. 2 is a view showing a lamp apparatus for a vehicle according to an embodiment of the present invention.
Figure 3:
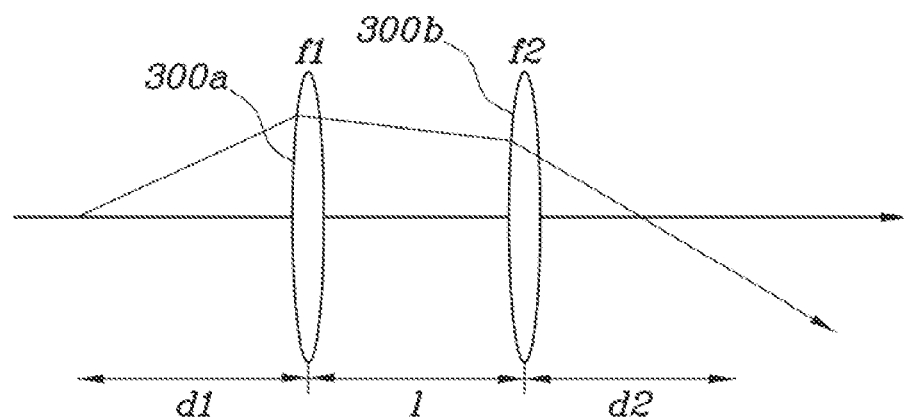
FIG. 3 is a view illustrating a lamp apparatus for a vehicle.

FIG. 2 is a view showing a lamp apparatus for a vehicle according to an exemplary embodiment of the present invention and FIG. 3 is a view illustrating a lamp apparatus for a vehicle.

A lamp apparatus for a vehicle according to an exemplary embodiment of the present invention, as shown in FIG. 2, includes: a light source 100 radiating light for specific images, reflectors 200 symmetrically disposed at both sides of the light source 100 and reflecting light from the light source 100, and a condensing lens 300 disposed ahead of the light source 100, receiving light from the light source 100 and light from the reflector 200. composed of two or more lenses to concentrate light, and having a curved shape with respect to the light source 100 so that a plurality of images is formed by the light from the light source 100.

The light source 100 has a shape for forming a 3D image so that specific type turned-on/off images can be formed by applying a single light source or surface light emission, depending on images.

The reflectors 200 reflecting the light from the light source 100 are mirrors and reflect the light from the light source 100 to the condensing lens 300.

In an exemplary embodiment of the present invention, the condensing lens 300 receives the light from the light source 100 and the light from the reflector 200. The condensing lens 300 may include two Fresnel lenses arranged symmetrically in the front-rear direction, ahead of the light source 100.

The Fresnel lenses make the light from the light source 100 into parallel light and concentrate it and the light coming out of the Fresnel lenses is concentrated on one focus, thereby implementing a 3D image. The two Fresnel lenses may have the same specifications to minimize distortion.

In particular, since the condensing lens 300 is curved forward with respect to the light source, an image formed by the light from the light source 100 and the light from the reflector 200 is formed into a plurality of images, so an image made by the light from one light source 100 can be shown within a wide range of angle.

In detail, the reflectors 200 are a left reflecting plate 220 and a right reflecting plate 240 symmetrically arranged at both sides of the light source 100 and the condensing lens 300 may be fixed between the left reflecting plate 220 and the right reflecting plate 240.

Since the reflector is divided symmetrically at both sides of the light source 100, light from the light source 100 can reflect from the left reflecting plate 220 and the right reflecting plate 240 and travel in the same amount in the same direction to the condensing lens 300. Further, the left reflecting plate 220 and the right reflecting plate 240 can allow the light reflecting from the left reflecting plate 220 and the right reflecting plate 240 to travel into the condensing lens 300 in the same way, fixing the condensing lens 300.

The condensing lens 300 includes a center lens 320 and a left lens 340 and a right lens 360 curved at a predetermined angle and extending from both ends of the center lens 320.

The left lens 340 and the right lens 360 may extend at the same angle as an observable angle (a) of an image formed through the center lens 320.

The image formed through the center lens 320 is the image formed by the light directly radiated from the light source 100. That is, the observable angle (a) of an image means the range where an image formed by the light radiated from the light source 100 and then passing through the center lens 320 can be observed, and can be determined through tests.

When the observable angle (a) of an image formed through the center lens 320 is determined, the images formed through the left lens 340 and the right lens 360 are added to the observable range of the image formed through the center lens 320 by changing the curved angle of the left lens 340 and the right lens 360 extending from both ends of the center lens 320 to be the same as the observable angle (a), so the corresponding image can be seen from various positions.

A structure for implementing various images at the position of the light source 100 is described. The light source 100, an actual light source, may be positioned in a central normal line 15 of the center lens 320, and a left virtual image light source 100a and a right virtual image light source 100b may be positioned in a central normal line 25 of the left lens 340 and a central normal line 35 of the right lens 360, respectively. Further, the actual light source and the virtual image light sources may be spaced at the same distance with the reflecting plates therebetween.

First, the position of the actual light source 100 can be determined from the following equation, $$\frac{1}{d_1} + \frac{1}{d_2} = \frac{1}{F}$$

where F is a composite focal distance of two Fresnel lenses, $d_1$ is the distance between the actual lens 100 and the first Fresnel lens 300a, and $d_2$ is the distance between the second Fresnel lens 300b and a protruding 3D image.

The composite focal distance of the two Fresnel lenses can be calculated from the following equation, $$\frac{1}{F} = \frac{1}{f_1} + \frac{1}{f_2} - \frac{l}{f_1 f_2}$$

where F is a composite focal distance of two Fresnel lenses, $f_1$ is the focal distance of the first Fresnel lens 300a. $f_2$ is the focal distance of the second Fresnel lens 300b, and l is the gap between the first Fresnel lens 300a and the second Fresnel lens 300b.

The focal distances of the first Fresnel lens 300a and the second Fresnel lens 300b depend on the specifications of the lenses, and the focal distances are made the same by using two lenses having the same specifications.

When the composite focal distance of the first Fresnel lens 300a and the second Fresnel lens 300b is determined, the position of the actual light source 100 can be determined from the above equation. The distance $d_2$ between the second Fresnel lens 300b and the protruding 3D image is determined in advance in accordance with the design, so the position of the actual light source 100 can be calculated by substituting values in the equation.

As described above, the actual light source 100 is positioned in the central normal line 15 of the center lens 320 and the position is determined by the equation, and when the curved angles of the left lens 340 and the right lens 360 are determined, the left virtual image light source 100a and the right virtual image light source 100b can be positioned in the central normal line 25 of the left lens 340 and the central normal line 35 of the right lens 360.

The reflector 200 includes the left reflecting plate 220 and the right reflecting plate 240, and when the left virtual image light source 100a and the right virtual image light source 100b are not in the central normal lines 25 and 35 of the left lens 340 and the right lens 360, respectively, the left virtual image light source 100a and the right virtual image light source 100b can be positioned in the central normal lines 25 and 35 of the left lens 340 and the right lens 360, respectively, by tilting the left reflecting plate 200 and the right reflecting plate 240 to a predetermined angle.

The positions of the left virtual image light source 100a and the right virtual image light source 100b can be determined from the equation in accordance with the composite focal distance of the left lens 340 and the right lens 360.

Accordingly, the light from the actual light source 100 makes a 3D image through the center lens 320 and makes 3D images at other angles by passing through the left lens 340 and the right lens 360 after reflecting from the left reflecting plate 220 and the right reflecting plate 240. Accordingly, 3D images can be observed within the range of the visible angles of an image made by the right from the actual light source 100 and the images made by the left virtual image light source 100a and the right virtual image light source 100b.

When observable angles (b and c) of images formed through the left lens 340 and the right lens 360 are different from the observable angle 10 of the center lens 320, the curved angles of the left lens 340 and the right lens 360 may be set smaller than the observable angle 10 of the center lens 320.

That is, when the observable angles (b and c) of 3D image formed by light passing through the left lens 340 and the right lens 360 are different from the observable angle (a) of a 3D image formed through the center lens 320, 3D images can be observed in a larger range from the 3D image formed through the center lens 320 by setting the curved angles of the left lens 340 and the right angle 360 smaller than the observable angles (b and c) of the center lens 320.

This phenomenon may be caused by differences in lens characteristics of the center lens 320, the left lens 340, and the right lens 360, so 3D images are accurately focused by adjusting the curved angles of the left lens 340 and the right lens 360.

According to a lamp apparatus for a vehicle that has the structure described above, a plurality of 3D images can be implemented from one light source, a package is reduced by simplifying the structure for implementing the 3D images, and the apparatus can be more freely designed.

For convenience in explanation and accurate definition in the appended claims, the terms "upper", "lower". "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lamp apparatus for a vehicle, comprising:

a light source radiating light for predetermined images;

reflectors symmetrically disposed at both sides of the light source and reflecting light from the light source; and a condensing lens disposed ahead of the light source, receiving light from the light source and light from the reflectors, having two or more lenses to concentrate light, and having a curved shape with respect to the light source so that a plurality of images is formed by the light from the light source, wherein the condensing lens includes a center lens and a left lens and a right lens curved at a predetermined angle and extending from both ends of the center lens, and the left lens and the right lens are curved at a same angle as an observable angle of an image formed through the center lens.

2. The lamp apparatus of claim 1, wherein the reflectors includes a left reflecting plate and a right reflecting plate symmetrically disposed at the both sides of the light source and the condensing lens is fixed between the left reflecting plate and the right reflecting plate.

3. The lamp apparatus of claim 1, wherein the condensing lens includes two Fresnel lenses symmetrically arranged in a front-rear direction.

4. The lamp apparatus of claim 1, wherein when observable angles of images formed through the left lens and the right lens are different from an observable angle of the center lens, curved angles of the left lens and the right lens are set smaller than the observable angle of the center lens.

5. The lamp apparatus of claim 1, wherein the light source is an actual light source and positioned in a central normal line of the center lens, and a left virtual image light source and a right virtual image light source are positioned in a central normal line of the left lens and a central normal line of the right lens, respectively.

6. The lamp apparatus of claim 5, wherein the reflectors include a left reflecting plate and a right reflecting plate, and the left reflecting plate and the right reflecting plate are tilted at predetermined angles so that the left virtual image light source and the right virtual image light source are positioned on the central normal lines of the left lens and the right lens, respectively.

* * * * *